US007822808B2

(12) United States Patent
Caplan et al.

(10) Patent No.: US 7,822,808 B2
(45) Date of Patent: Oct. 26, 2010

(54) COLLECTION AND DISTRIBUTION OF SENSE-ON-DEMAND DATA

(75) Inventors: Alan Caplan, Seattle, WA (US); Keith D. Rosema, Seattle, WA (US)

(73) Assignee: Motenet, Inc., Seattle, WA (US)

( * ) Notice: Subject to any disclaimer, the term of this patent is extended or adjusted under 35 U.S.C. 154(b) by 669 days.

(21) Appl. No.: 11/739,086

(22) Filed: Apr. 23, 2007

(65) Prior Publication Data

US 2007/0288480 A1    Dec. 13, 2007

Related U.S. Application Data

(60) Provisional application No. 60/794,198, filed on Apr. 21, 2006, provisional application No. 60/800,527, filed on May 15, 2006, provisional application No. 60/830,953, filed on Jul. 14, 2006, provisional application No. 60/869,403, filed on Dec. 11, 2006.

(51) Int. Cl.
    *G06F 15/13* (2006.01)
(52) U.S. Cl. .................. 709/203; 709/201; 709/202; 709/219; 709/220; 455/456.2; 455/456.3; 455/456.5
(58) Field of Classification Search .......... 709/201, 709/202, 203, 219, 220; 455/456.2, 456.3, 455/456.5
    See application file for complete search history.

(56) References Cited

U.S. PATENT DOCUMENTS

| 6,212,392 | B1 * | 4/2001 | Fitch et al. | 455/456.2 |
|---|---|---|---|---|
| 6,321,092 | B1 * | 11/2001 | Fitch et al. | 455/456.5 |
| 6,904,033 | B1 | 6/2005 | Perras et al. | |
| 7,236,799 | B2 * | 6/2007 | Wilson et al. | 455/456.3 |
| 7,447,731 | B2 * | 11/2008 | Calo et al. | 709/201 |
| 2001/0021930 | A1 * | 9/2001 | Bouve et al. | 707/7 |
| 2002/0040366 | A1 | 4/2002 | Lahr | |
| 2003/0046168 | A1 | 3/2003 | Muller | |
| 2004/0107220 | A1 | 6/2004 | Natesan et al. | |
| 2005/0159998 | A1 | 7/2005 | Buyukkokten et al. | |
| 2005/0165925 | A1 | 7/2005 | Dan et al. | |
| 2006/0031384 | A1 | 2/2006 | Manders et al. | |

OTHER PUBLICATIONS

International Search Report for International Patent Application No. PCT/US07/67247, MediaMote, Inc., Nov. 2, 2007 (2 pages).

* cited by examiner

*Primary Examiner*—Jinsong Hu
(74) *Attorney, Agent, or Firm*—Perkins Coie LLP (57) ABSTRACT

A method and system for collecting and distributing sense-on-demand data is provided. The sense-on-demand data system uses a network of centralized computers and remote units. The centralized computers may be operated by or on behalf of the operator of the sense-on-demand data system, and the remote units may be operated by users of the network. The remote units may consist of a variety of mobile and fixed-location devices, such as cellular telephones, personal data assistants, laptop computers, desktop computers, and stand-alone data sensor units. The system receives requests for information, identifies remote units that are proximate to the location, forwards the requests to the identified remote units, receives responses from the remote units, and provides responses to the requester.

42 Claims, 9 Drawing Sheets

Mote.Net

Picture Request

How are conditions at the half-pipe at the base of Crystal Mountain Resort?

Reject             Accept

302

Mote.Net                Camera

Reject              Send

303

Mote.Net

Thank you!

Your response has been sent.

Response: XYZ123
Time sent: 1:30 PM
Date sent: 5/1/07

End               MoteNet

COLLECTION AND DISTRIBUTION OF SENSE-ON-DEMAND DATA

CROSS-REFERENCE TO RELATED APPLICATION

This application claims the benefit of U.S. Provisional Application No. 60/794,198 entitled "System and Method for Conducting Transactions Using a Distributed Media Content Network," filed Apr. 21, 2006, U.S. Provisional Application No. 60/800,527 entitled "System and Method for Conducting Collaborative Activities Using a Distributed Media Content Network," filed May 15, 2006, U.S. Provisional Application No. 60/830,953 entitled "System and Method for Collecting and Distributing Presence-Based Data" filed Jul. 14, 2006 and U.S. Provisional Application No. 60/869,403 entitled "System and Method for Processing Network Requests for Presence-Based Data," filed Dec. 11, 2006, which applications are hereby incorporated by reference in their entireties.

BACKGROUND

People often make decisions based on inadequate or outdated information. When bad information leads to bad choices, people waste time and money, become frustrated or miss opportunities. An example occurs when a parent chooses to take his children skiing at a particular ski area, only to find out, after driving for 90 minutes, that the ski area is too crowded or the conditions are poor. If the parent had had better information, the family might have gone to a different resort or chosen a different activity.

Although the World Wide Web provides access to a vast amount of information, the information may not be up to date or may not be entirely accurate. Continuing with the skiing example, the parent may access a Web page for the ski resort to check current conditions. The condition reported via the Web page, however, may only be updated on an hourly basis and may only represent statistics at that particular point in time. Thus, the parent who accesses the Web page may only be able to get weather information that is somewhat outdated and that may only represent a snapshot in time, rather than represent how the weather is trending. In addition, the ski resort may post information that tries to accentuate the positive information (e.g., "all 8 lifts are up and running and all slopes are well-groomed"), while omitting to report some negative information (e.g., "the average lift wait time is 45 minutes"). In addition, the information accessible via the Web relates to only a fraction of real-world locations, things, and activities. For example, the parent who decides not to go skiing, but wants to go to a local festival instead, may want to find out about current conditions (e.g., crowd size or ease of parking). Although the sponsors of the festival may provide a Web page for the festival, the Web page may not have any real-time information available on the current conditions at the festival. As such, the parent may take the family to the festival only to find the experience less that satisfying since the crowds were much larger than anticipated. In general, the process of posting data to the Internet usually creates a delay between the time that information is captured and the time it is made available. As a result, the Web often is a poor source for real-time information.

DETAILED DESCRIPTION

A method and system for collecting and distributing sense-on-demand data is provided. The sense-on-demand data system uses a network of centralized computers and remote units or devices. In one embodiment, the centralized computers may be operated by or on behalf of the operator of the sense-on-demand data system, and the remote units may be operated by users of the network. The remote units may consist of a variety of mobile and fixed-location devices, such as cellular telephones, personal data assistants, laptop computers, desktop computers, and stand-alone data sensor units. In some embodiments, there may be a one-to-one correlation between users and remote units. In others, a single user may have several remote units that are available to collect and transmit data. The remote units may periodically transmit status, location, availability, and other information to other system components, such as remote unit proxy servers and the query engine (described below).

The sense-on-demand data system may include a query interface component, a means by which users submit data requests to the system. In one embodiment, the query interface component accommodates request submissions from a variety of sources, such as a Web site created and maintained by the system operator, third-party Web sites that contain embedded links to the system, and mobile devices such as cellular telephones. The query interface component may accept the data request, assess the request's basic validity against defined parameters, and transmit the request to the system. The sense-on-demand data system also may include a query prefilter component. The query prefilter component generates metadata terms that are added to a data request to assist in the distribution of the request to potential responders. Prefilter-generated metadata terms may include, for example, the type of requesting device, the nature and context of the request, preference information furnished by the requesting user that has been stored in the requesting user's account, and preference information that has been observed by the system.

The sense-on-demand data system may include a query engine, which parses and processes data requests, determines which remote units will receive data requests, and transmits data requests to those remote units. In one embodiment, the query engine sends a given data request both to remote units and to the system's response storage archive (described below). In one embodiment, the query engine operates in accordance with a set of algorithms for matching data requests with potentially responding remote units, which algorithms serve to increase the likelihood that the remote units that receive a data request will produce acceptable data responses. For example, when a parent sends a data request asking about ski conditions at a ski resort, the query engine may forward the request to responding remote units at the ski resort (e.g., cell phones of people currently skiing). In one embodiment, the query engine sends a data request to an initial group of potentially responding remote units and then, if those remote units fail to provide accessible responses in a designated time period, sends the data request to successive, additional groups of remote units until a satisfactory response set is obtained. When a remote unit receives a request, it may at that point collect requested information from a user or from a sensor. Thus, the remote unit senses or collect information on demand or in response to receiving a request.

The sense-on-demand data system may contain a storage archive, which stores and organizes data responses and, when queried, transmits relevant data responses to the response server. The sense-on-demand data system may contain a response server, which receives new data responses from remote units and archived data responses from the storage archive, creates result sets for data requests, and then distributes or makes accessible result sets according to designated distribution rules. In one embodiment, the response server creates and distributes result sets throughout a data request's time-in-force (described below), initially distributing a result set based on data responses obtained from the storage archive, and then distributing revised result sets that incorporate new data responses as they are received from responding remote units. Continuing with the skiing example, when the response server receives a data request asking about conditions at the ski resort, it may forward the data request to the cell phones of current skiers and retrieve from the storage archive the last responses it received in response to a similar query. The response server may immediately provide a response to a new data request based on the information from the last response to the similar ski request. When the response server ultimately receives a response to the new ski request from a current skier, it can provide an updated response to the new ski request. In one embodiment, the response server distributes result sets to destinations, and in formats, specified by the relevant requesting users or by the system operator. Such destinations may include, among other things, Web pages served by the system to requesting users, cellular telephones and other portable communication devices operated by requesting users, personal archives of requesting users that are stored on the system, and the system's storage archive.

In one embodiment, the sense-on-demand data system may include proxy servers that create and maintain virtual network representations of remote units. A proxy server may store and make available to the system information regarding one or more remote units. Such information may include, for example, a remote unit's identification, type, location, and availability. The system may use such information for, among other things, determining which remote units will receive data requests. In one embodiment, proxy servers also may store and make available to the system sense-on-demand data and/or metadata uploaded from remote units on a periodic basis. In such case, the query engine will transmit data requests first to proxy servers associated with relevant remote units, which will provide data responses to the extent they possess adequate information. If the proxy servers lack sufficient information to provide data responses, they will transmit the data requests to their associated remote units. For example, devices at various locations throughout a ski area may upload the current wind speed to a proxy server every minute. A skier at the ski area deciding whether to return to an upper slope may send a data request for the current wind speed at the upper slope. The system may forward the data request to the proxy server for the devices and provide a data response that includes the wind speed measure within the last minute and a history of wind speeds over the last hour.

In one embodiment, the sense-on-demand data system will install and maintain data servers on some or all remote units or proxy servers. A remote unit data server may include a file system component that stores data collected by the remote unit, together with metadata regarding such stored data, and information regarding the remote unit's status, availability, and functional capacities. A remote unit data server may also include a transmission protocol component that determines when certain information is transmitted automatically to the remote unit's network proxy or to the system's storage archive. In one embodiment, where the sense-on-demand data system includes remote units that lack sufficient memory or computational power to host remote unit data servers, the system may include device aggregation servers. Device aggregation servers provide an intermediate interface between the system and multiple limited-capacity remote units. Device aggregation servers receive periodic information transmissions from associated remote units in accordance with relatively simple communication protocols, and are available to respond to more complex data requests from the query engine.

The sense-on-demand data system may include a network address management component that converts remote units' native addresses—such as IP addresses or cellular phone numbers—to "system" addresses, and vice versa. By doing so, the address management component enables the sense-on-demand data system to distribute data requests to remote units throughout the network, regardless of their native addressing schemes (or lack thereof. In one embodiment, the address management component contains a facility that assigns system addresses to remote units, a database that associates remote units with their native addresses (if any) and their system addresses, and a translation facility that translates remote units' native addresses to system addresses, and vice versa. In one embodiment, to maintain user privacy, the addressing system identifies remote units on a temporary basis using combinations of transitory state information and public network keys that bear no relationship to a user's personal or account information.

The sense-on-demand data system may contain a location management component that tracks the geographic location of remote units on a periodic or continuous basis. In one embodiment, the location management component has a location prediction facility that derives predicted locations for remote units based on location reports that are periodically submitted by remote units and on patterns of remote unit movement observed over time by the system. When the sense-on-demand data system receives a data request relating to a specific location, the location management component either may assume that remote units with nearby predicted locations have actual locations nearby the location of interest, or the location management component may query such remote units to determine their actual locations. In one embodiment, the location management component contains a translation facility that converts location descriptors (such as physical addresses, street intersections, and place names) to normalized location identifiers that are suitable for use with GPS and other location derivation systems, and vice versa. In another embodiment, to maintain user privacy, the location management subsystem assigns anonymous tokens (e.g., remote unit identifiers that do not include users' personal or account information) to remote units for general tracking purposes.

Figure 1:
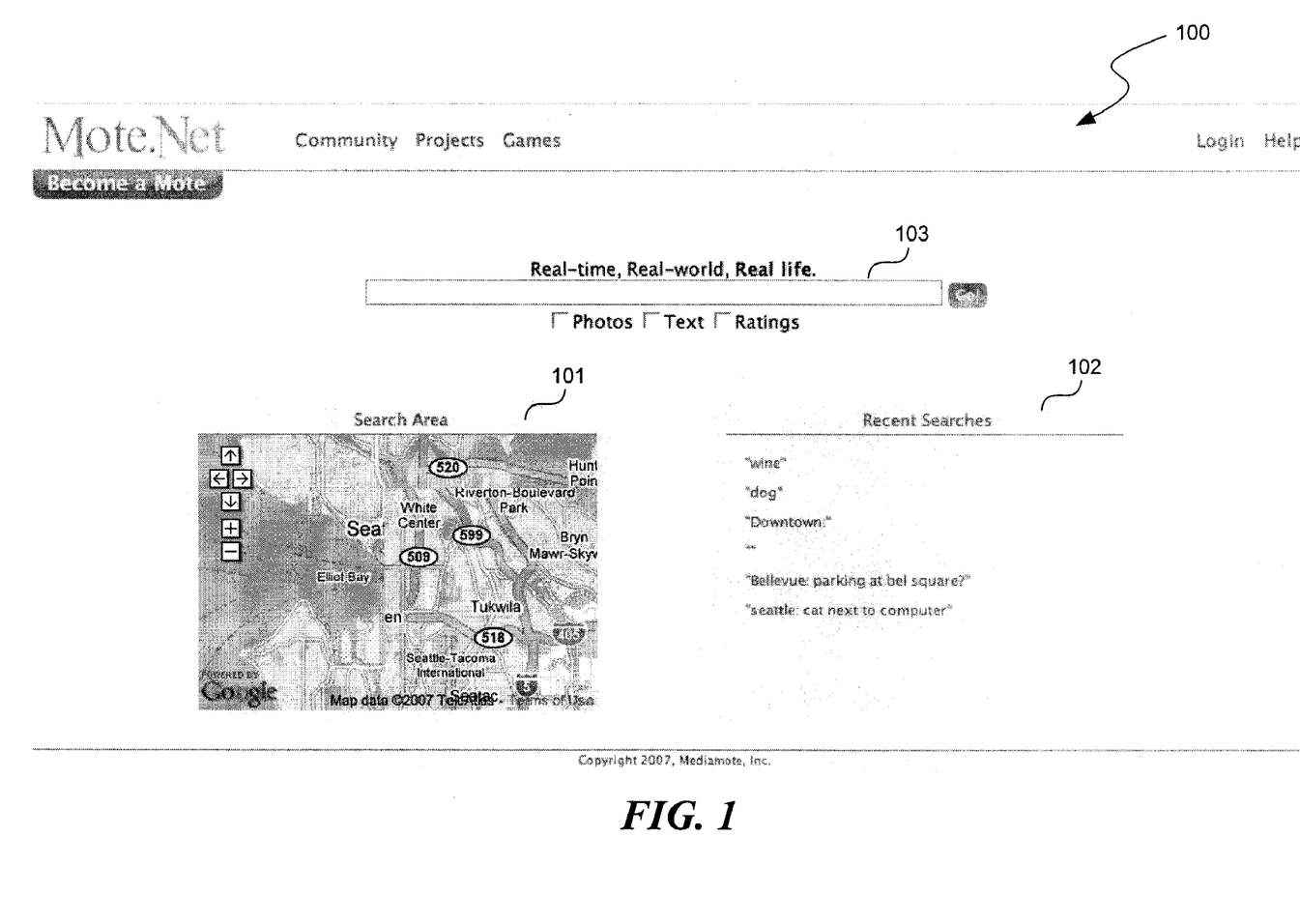
FIG. 1 is a display page that illustrates a user interface for submitting a request of the sense-on-demand data system in one embodiment.

FIG. 1 is a display page that illustrates a user interface for submitting a request of the sense-on-demand data system in one embodiment. The display page 100 includes a request location map 101, a recent searches area 102, and a request entry area 103. The recent searches area contains a listing of recent requests submitted by the user. For example, the user recently submitted the request "Parking at bel square" for the location "Bellevue." The user can specify a location by moving about and zooming in and out of the request location map, entering the request in the request entry area, and selecting the go button.

Figure 2:
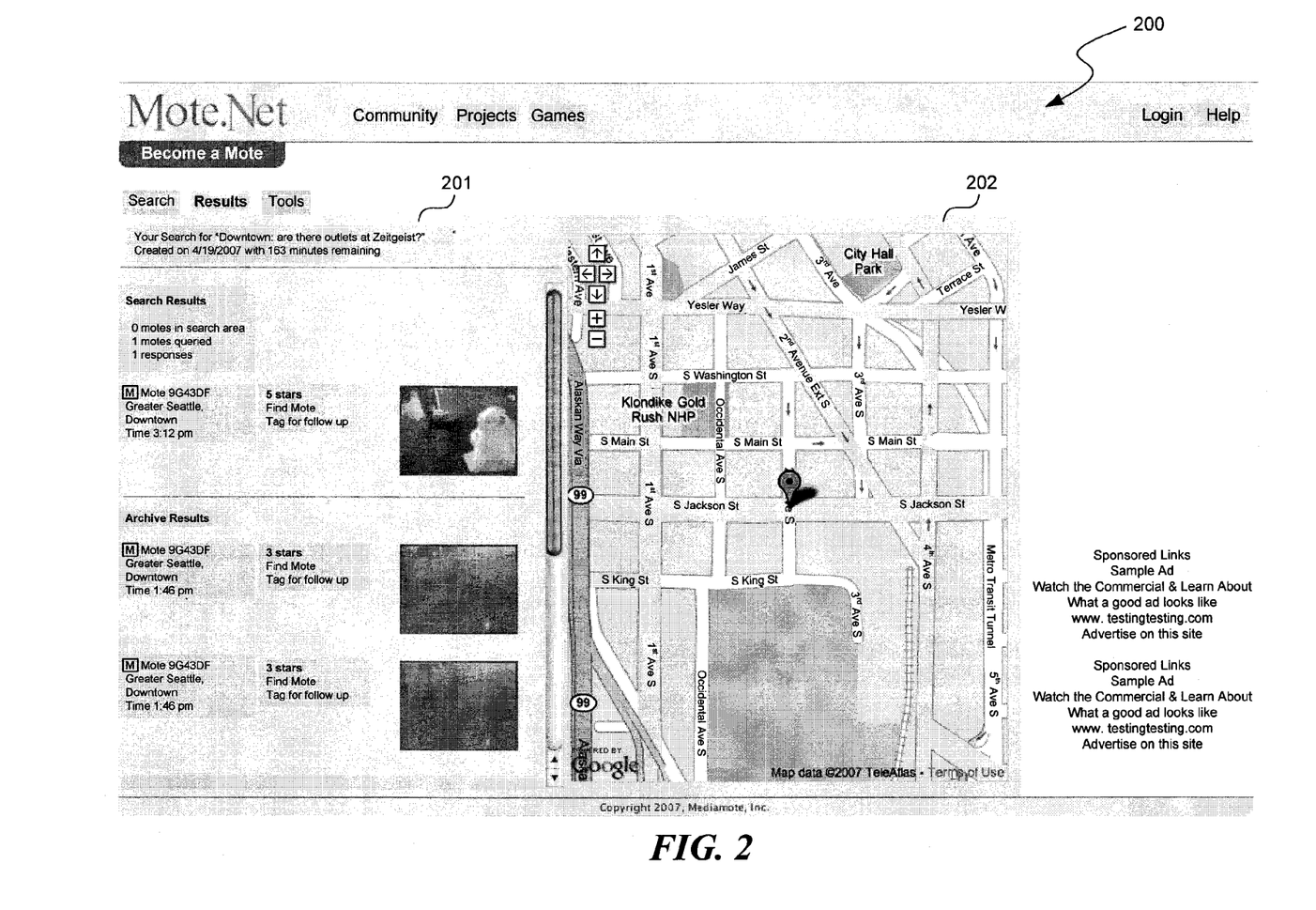
FIG. 2 is a display page that illustrates a user interface for reviewing a response of the sense-on-demand data system in one embodiment.

FIG. 2 is a display page that illustrates a user interface for reviewing a response of the sense-on-demand data system in one embodiment. The display page 200 includes a results area 201 and a location area 202. The results area contains some archived results and a result received in real-time. The location area includes the location of the request and identifies the location of the responder.

Figure 3:
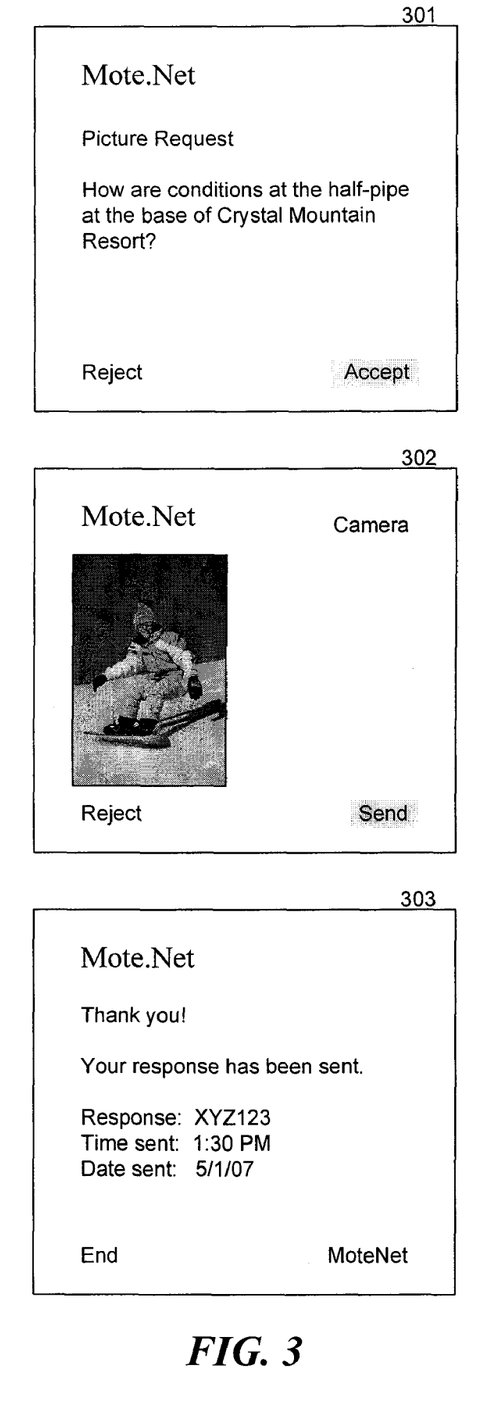
FIG. 3 is a display page that illustrates a user interface for responding to a request of the sense-on-demand data system in one embodiment.

FIG. 3 is a display page that illustrates a user interface for responding to a request of the sense-on-demand data system in one embodiment. A user of a remote device may be presented with display page 301 that provides the request and reject and accept buttons. If the user accepts, then display page 302 displays the picture taken by the user as a response and reject and send buttons. When the user selects the send button, the picture is sent as a response to the request. Display page 303 confirms that the response has been sent.

Figure 4:
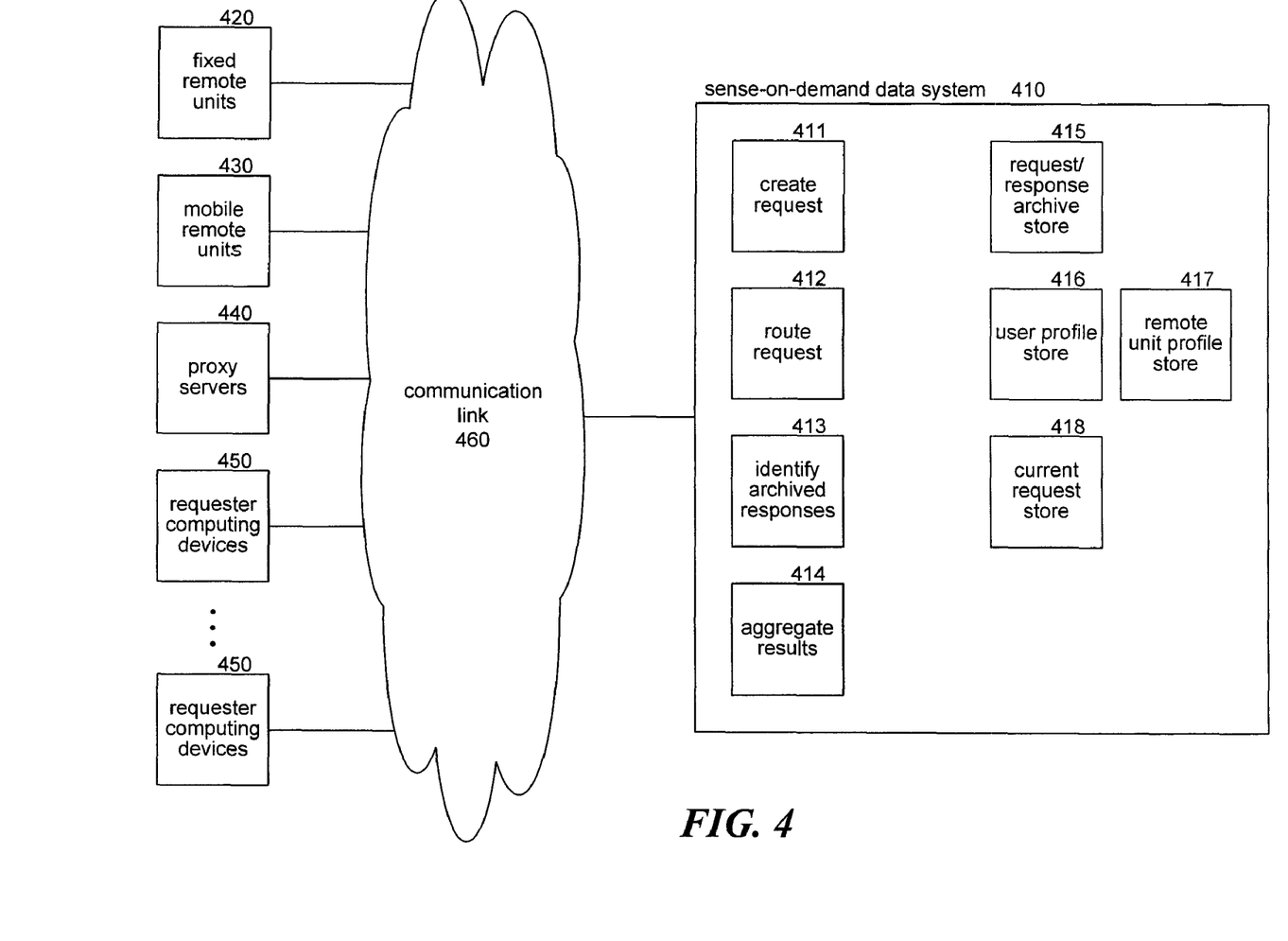
FIG. 4 is a block diagram that illustrates components of the sense-on-demand data system in one embodiment.

FIG. 4 is a block diagram that illustrates components of the sense-on-demand data system in one embodiment. The sense-on-demand data system 410 is connected to fixed remote units 420, mobile remote units 430, proxy servers 440, and requester computing devices 450 via communication link 460. The system includes a create request component 411, a route request component 412, an identify archived responses component 413, and an aggregate results component 414, which are described below in detail. The system also includes a request/response archive store 415, a user profile store 416, a remote unit profile store 417, and a current request store 418. The request/response archive store stores requests and their corresponding responses. The user profile store contains the profile of each user including preferences, requester/responder history, current location, and so on. The remote unit profile store contains information describing the various remote units, such as location, type of information collected, and so on. The current request store may include an entry for each current request. Each entry may identify the requester, potential responses, responses received so far, time-in-force, and so on.

The computing device on which the sense-on-demand data system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the sense-on-demand data system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the sense-on-demand data system may be implemented and used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The sense-on-demand data system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, separate computing systems may collect requests, route responses, collect responses, archive responses, and so on.

Data Transaction

Request Creation

Figure 5:
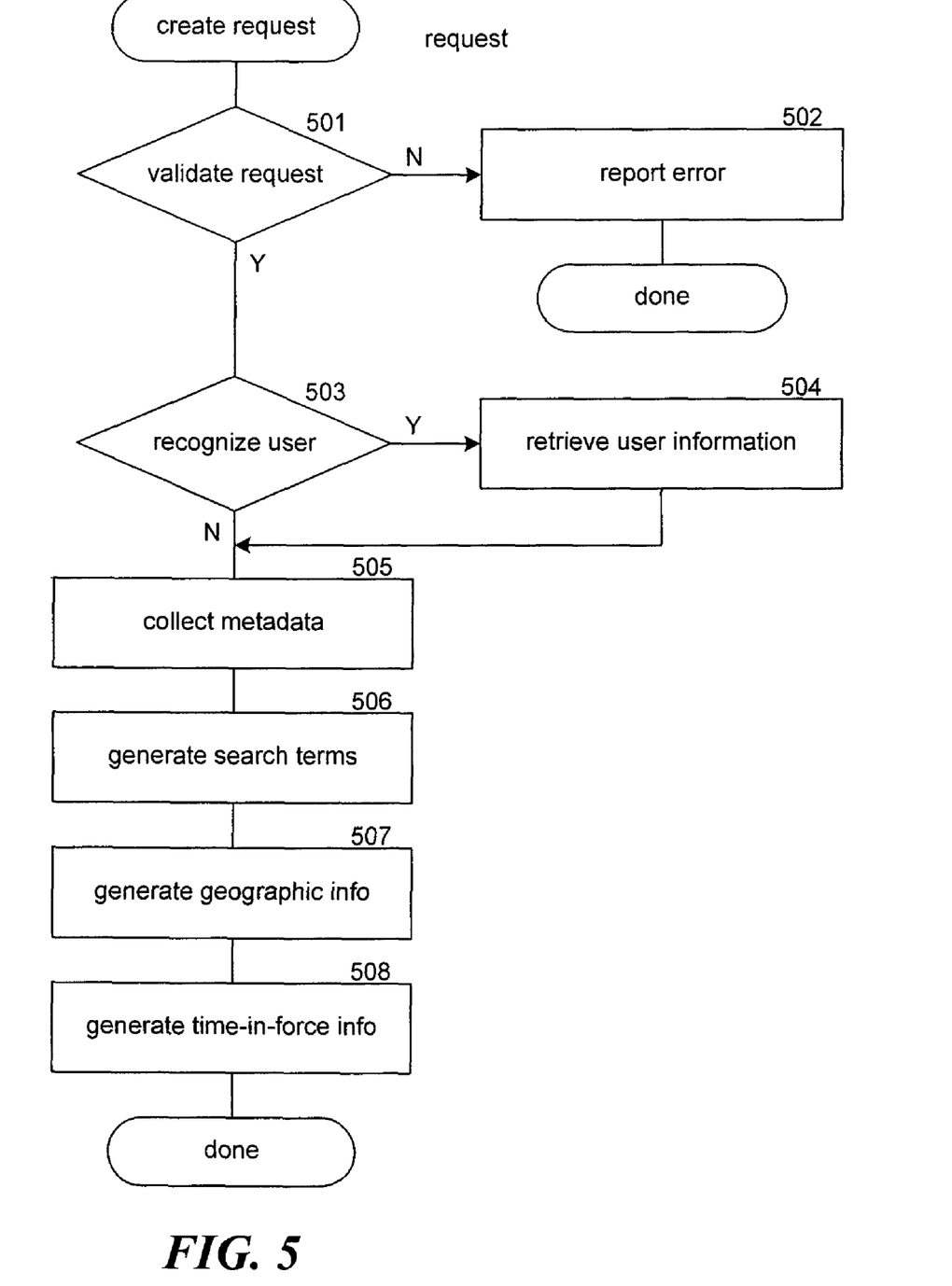
FIG. 5 is a flow diagram that illustrates overall processing of a create request component of the sense-on-demand data system in one embodiment.

The sense-on-demand data system may be used to create data requests. FIG. 5 is a flow diagram that illustrates overall processing of a create request component of the sense-on-demand data system in one embodiment. Data requests may be generated by system users from mobile or fixed communication devices, by the system operator on an ad hoc or programmatic basis, by the system on an autonomous basis, and by users of third-party data sources (such as Web sites and other information repositories) that contain embedded links to the system. Each data request may contain terms that are used by the system to route the request to specific remote units and to identify the desired information. A user who submits a data request typically will not know of the specific remote units that will be requested to respond to the request. The sense-on-demand data system will identify the appropriate remote units as described below. When a data request is submitted to the query interface component, the query interface component determines (501) whether the data request is valid in form and content for further processing. If the data request is not adequate, the query interface component sends (502) an error message to the requesting user. If the query is adequate, the query interface component recognizes (503) the user and retrieves (504) information of the user, such as the user's profile. The query interface component sends the data request to the query prefilter component. The query prefilter component may append (506-508) additional search criteria to the data request, geographic information, and time-in-force information. In one embodiment, the query prefilter component adds search criteria that are extracted from the requesting user's account preferences (505), and search criteria that are generated by the query prefilter component relating to observed characteristics of the requesting user and the nature and context of the data request. The query prefilter component then sends the complete data request to the query engine.

Continuing with the skiing example, a parent who is considering a day trip to a local ski resort may submit a data request from a personal computer requesting information regarding conditions at the ski resort. In such case, the submitted request might consist of the following words: "How are conditions at the half-pipe at the base of Crystal Mountain Resort?" When the request is received by the query prefilter component, the query prefilter component may append search criteria extracted from the requesting user's account, such as the user's preference to receive photographs (as opposed to text or video) and to receive responses only to responders who have a "three star" rating. The system may have a technique for rating responders based on feedback received from requesters, timeliness of responses, general availability of the responder, and so on.

The sense-on-demand data system may permit data requests to have a "time-in-force," which is a specified or variable period of time during which the data request is available for response. In one embodiment, the time-in-force may be determined by the requesting user, who may assign a start time, condition, or event for the request, a fixed or variable time during which the request will remain active, and/or an end time, condition, or event for the request. Continuing with the skiing example, the parent who is considering a day trip to a local ski resort may designate a "time-in-force" of 30 minutes, the time it takes him to prepare and eat breakfast. In such instance, the system may deliver responsive information to the requesting user throughout the designated period, as the information is received by the system. In another embodiment, a data request's time-in-force may be determined by the system considering a variety of factors, such as the nature or context of the data request and the availability of responsive data. For example, a request for current wind speed at an upper slope submitted by a skier at the base of the slope may have an automatically determined time-in-force that is very short (e.g., 5 minutes) or may have a time-in-force that ends when the system detects that the skier is moving up the slope (e.g., riding a ski lift). The sense-on-demand data system may deliver responsive information to the requesting user at various times during a data request's time-in-force, either on a periodic basis or as data responses are received.

Request Routing

Figure 6:
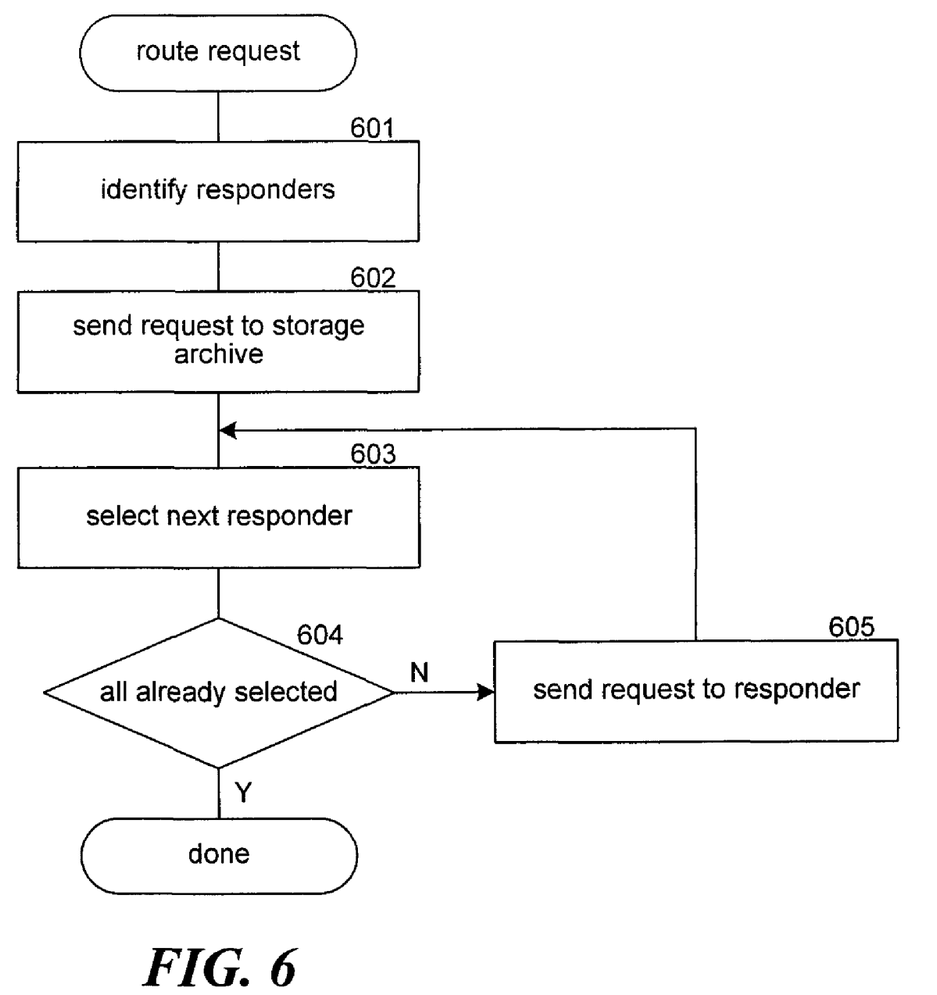
FIG. 6 is a flow diagram that illustrates overall routing of a route request component of the sense-on-demand data system in one embodiment.

When the query engine receives a data request, the query engine calls a parsing component to identify request terms that are relevant to routing the request. The query engine then provides those request terms, along with any additional metadata terms assigned by the query prefilter, to a routing component that selects zero, one, or multiple remote units (or their associated proxy servers) to receive the data request. FIG. 6 is a flow diagram that illustrates overall routing of a route request component of the sense-on-demand data system in one embodiment. The component identifies (601) potential responders. The routing component using various matching algorithms that compare the relevant request terms with information regarding the current status, availabilities, capabilities, and other criteria of remote units, and then produces a ranked list of target remote units or groups of target remote units. The routing component may rank the remote units based on various attributes such as location of the remote device, authorization of the remote device, third-party ranking of the remote device, sensing type of the remote device, and time since last request was sent to the remote device. The component may weight the attributes using linear and non-linear weights. The component may learn the weight using various machine learning techniques such a linear regression. The component sends (602) the request to the storage archive to determine if any recent responses have been received from a potential responder. The component then sends (603-605) relevant portions of the data request to one or multiple target remote units (or their associated proxy servers). In one embodiment, the transmission component sends the data request initially to one or more target remote units with the highest rankings and, if those remote units fail to provide satisfactory data responses, sends the data request to one or more additional target remote units with the next highest rankings.

For example, when the query engine component receives the data request relating to ski conditions at Crystal Mountain, the parsing may identify the terms "Crystal," "Mountain" and "Resort" as location terms. Using those location terms and the metadata assigned by the query prefilter component (e.g., preference for qualified responders who can provide photographs), the routing component may identify eight potential responders who are located at the Crystal Mountain Resort and who may be capable and willing to provide a responsive photograph during the applicable time-in-force. In such case, the transmission component may initially send the data request to the three potential responders who have been assigned the highest routing rankings by the routing component.

Creation of Data Responses

Figure 7:
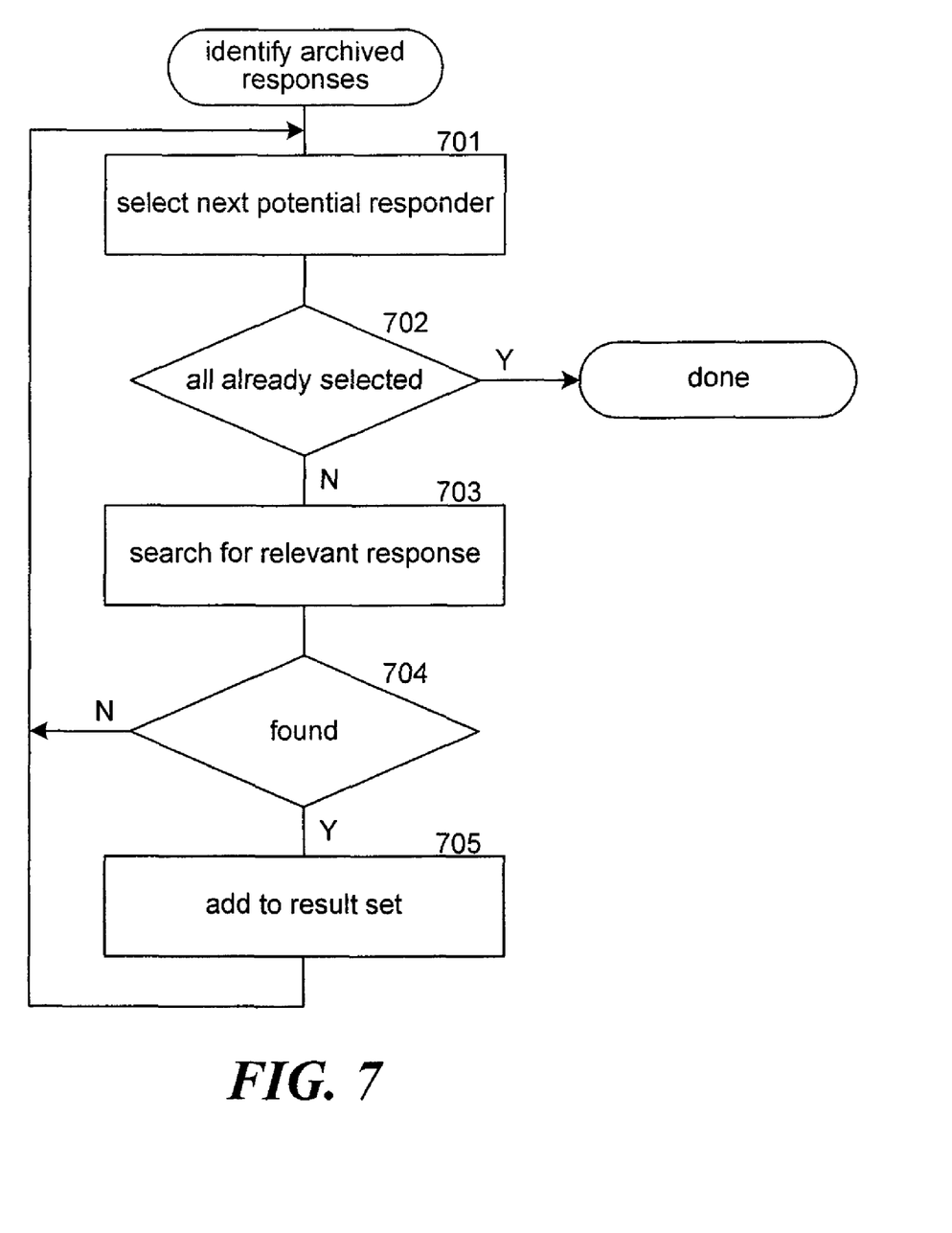
FIG. 7 is a flow diagram that illustrates overall processing of an identify archived responses component of the sense-on-demand data system in one embodiment.

In any given case, the query engine will transmit a data request to one or more of the following: target remote units, proxy servers associated with target remote units, and the storage archive. FIG. 7 is a flow diagram that illustrates overall processing of an identify archived responses component of the sense-on-demand data system in one embodiment. When the storage archive receives a data request from the query engine, it loops (701-705), selecting each potential responder and comparing the request with the content and metadata of stored data responses. Using various matching algorithms and operational instructions, the selection component identifies (703) those stored data responses that are relevant to the data request, and the storage archive then transmits (705) those data responses to the response server.

When a remote unit proxy server receives a data request, it compares the request with its stored information to determine if it is capable of providing a satisfactory data response. If so, the proxy server creates a data response and transmits it to the response server. If the proxy server is incapable of providing a satisfactory data response, it may forward the data request to the appropriate associated remote unit and/or it may inform the query engine that it cannot provide a satisfactory response.

Figure 8:
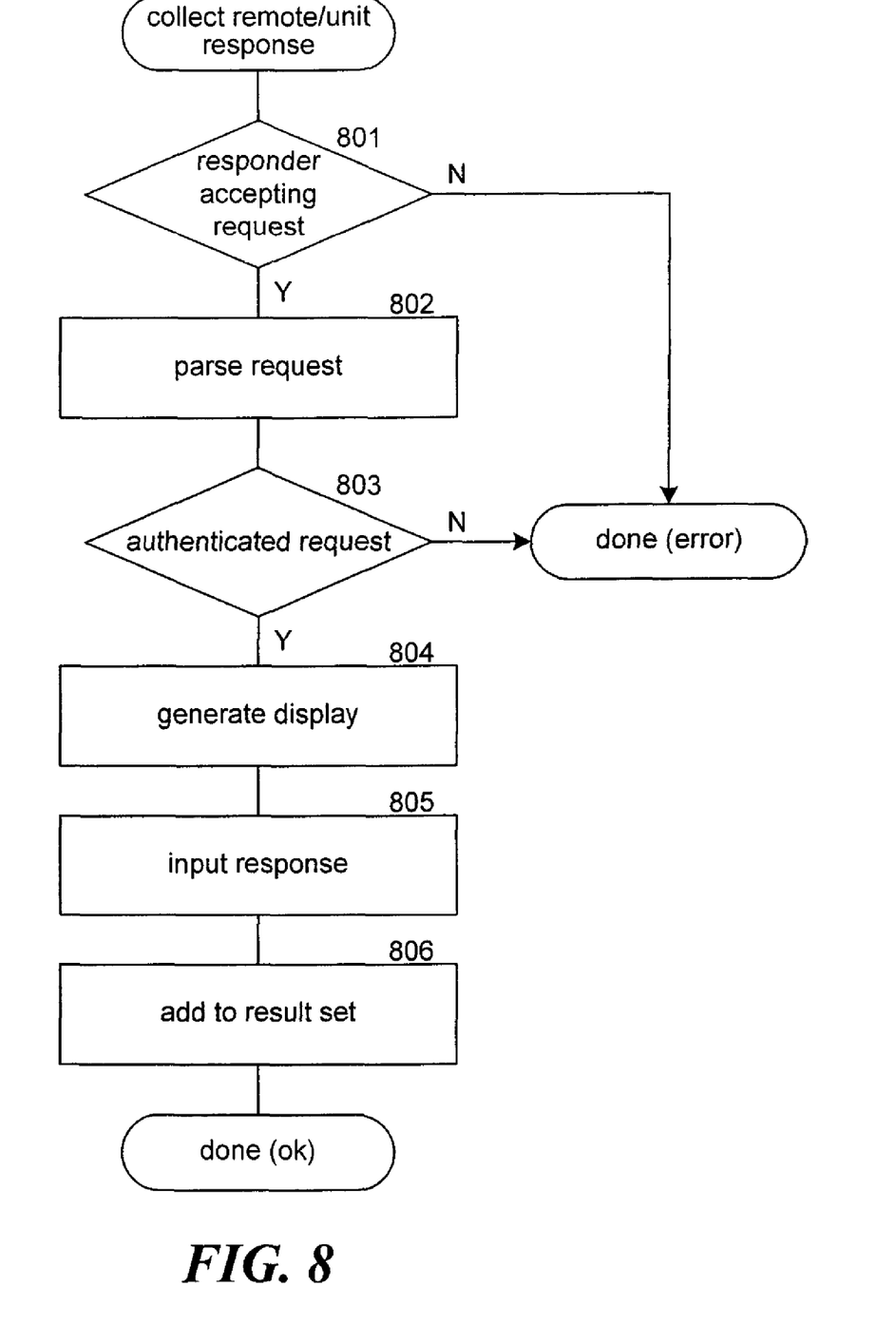
FIG. 8 is a flow diagram that illustrates overall processing of a collect remote unit response component of the sense-on-demand data system in one embodiment.

When a remote unit receives a data request from the query engine or a proxy server, it uses various algorithms and operational instructions to determine whether it will accept the data request and whether it can provide a response. FIG. 8 is a flow diagram that illustrates overall processing of a collect remote unit response component of the sense-on-demand data system in one embodiment. The owner or operator of the remote unit is provided (801) the option of accepting or rejecting the data request, or of establishing rules by which the remote unit may automatically accept or reject the data request. The remote unit parses (802) and authenticates (803) the request. For remote units whose functions require the assistance of a human user, the remote unit creates (804) a user interface and inputs (805) responsive information from the user or captures responsive information already in the remote unit. The remote unit will combine the responsive information with appropriate metadata to create a data response, and then transmit (806) the data response to the response server. For remote units whose functions do not require the assistance of a human operator, the remote unit will capture responsive information, combine the responsive information with appropriate metadata to create a data response, and then transmit the data response to the response server.

For example, when the query server distributes the data request relating to ski conditions at Crystal Mountain Resort, the query engine may send the request to the storage archive and to the proxy servers associated with the three targeted remote units. When the storage archive receives the data request, the selection component may select recently stored data responses relating to Crystal and the nearby Stevens Pass and Snoqualmie Pass resorts, and send those responses to the response server. When the remote unit proxy servers receive the data request, they may determine that they possess insufficient information to create satisfactory data responses, and then may forward the data request to their associated remote units (which, in this example, consist of cellular telephones). When the remote units receive the data request, they display the request by means of a user interface that presents the text of the request and graphic buttons for accepting or rejecting the request. When a potential responder accepts the request, the remote unit's camera function is activated, and the responder captures a responsive picture of the half-pipe and indicates that the picture is satisfactory (by pressing an "accept and send" button). The remote unit then adds metadata, such as location and time information, and transmits the data response to the response server.

Creation and Distribution of Result Sets

Figure 9:
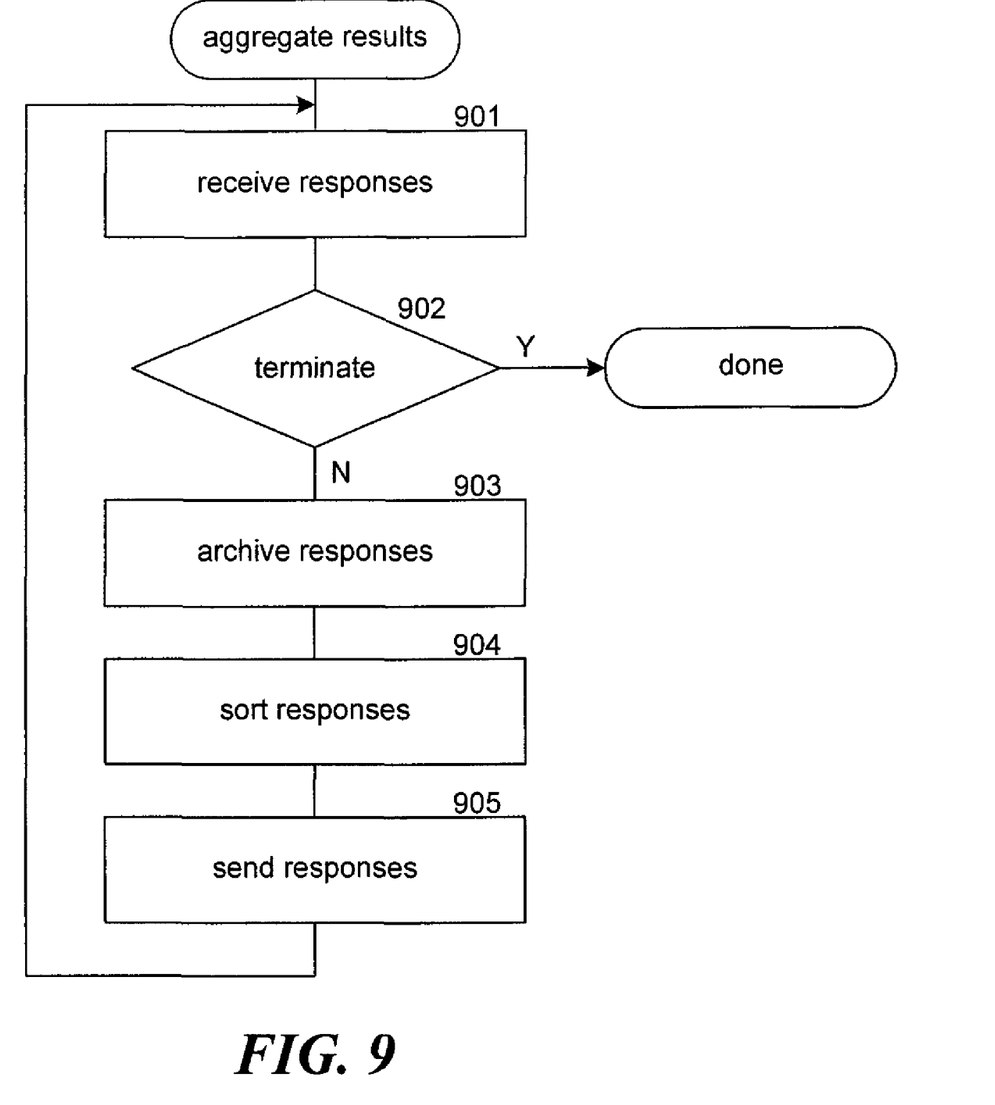
FIG. 9 is a flow diagram that illustrates overall processing of an aggregate results component of the sense-on-demand data system in one embodiment.

The response server may have a result creation component that aggregates data responses received for particular data requests into result sets for such requests. FIG. 9 is a flow diagram that illustrates overall processing of an aggregate results component of the sense-on-demand data system in one embodiment. The component waits (901) to receive responses. If a termination condition (e.g., time-in-force has expired) is satisfied (902), then the component completes. Otherwise, it may archive (903), sort (904), and send (905) the responses. The component may create an initial result set for a given data request when it receives the first data response relating to the request, and then may create new versions of the result set as it receives additional relevant data responses. The response server may have a distribution component that distributes result sets when they are created by the result creation component. In one embodiment, the distribution component may send the response set to the storage archive, and also make the response set available to the requesting user in one or more manners of presentation. In one embodiment, the distribution component determines the form and method of presentation based on the preferences of the requesting user and the means by which the requesting user intends to access the response set. In one embodiment, the distribution component may present the result set as a Web page, may cause the requesting user's Web browser to be redirected to that Web page, and may add links to the Web page to the requesting user's personal archive. As new versions of the response set are created, the distribution component may refresh the result set Web page.

In the ski resort example, the response server may create an initial result set from the data responses received from the storage archive, and then may present the initial result set to the requesting user in the form of a Web page. As the response server receives new data responses from remote units, the response server revises the result set to include the new responses, and presents the new responses by refreshing the result set Web page. In addition, the response server may insert links to the result set Web page into the requesting user's personal archive, allowing him to review the data responses at a later time.

The sense-on-demand data system may contain an advertising engine that delivers contextually appropriate advertising to system users. In one embodiment, the advertising engine may include a storage component that stores advertisements that are available for display, a selection component that selects advertisements that are related to users' interactions with the system, and a distribution component that presents selected advertisements to users in a variety of manners. In the ski resort example, the advertising engine may select advertisements relating to ski resorts and ski stores in the Seattle area, and transmit those advertisements to the response server for insertion into the result set Web page.

The sense-on-demand data system may contain a compensation engine that provides monetary and other compensation to responders. In one embodiment, the responder may accrue monetary compensation based on all or a portion of fees collected from the requesting user, all or a share of advertising revenue that is attributable to his response, or a fixed fee determined by the system operator. In another embodiment, the responder may receive non-monetary compensation, such as tokens of value that may be exchanged for goods or services, or access to system features. In another embodiment, the system may maintain reputation information or ratings for responders that are determined over time by, among other things, the frequency and quality of their responses.

The sense-on-demand data system may contain an electronic marketplace, where requesting users who are willing to pay money for data responses may direct their requests to potential responders that would like to receive monetary compensation for their data responses. In one embodiment, requesting users may attach marketplace-related metadata to their searches, such as the amount they are willing to pay for requested data, and potential responders may indicate the price they require to provide responses. Such metadata and pricing information may be used by the query engine to route requests to appropriately situated and qualified responders. The marketplace may contain a payment component by which requesting users are charged for their requests, and by which responders receive payment for their responses. In one embodiment, the marketplace autonomously determines the price for a given data transaction based on information provided by the requesting user and the responder. In another embodiment, the price for a given data transaction is determined by auction or reverse auction.

The sense-on-demand data system may include discovery features that allow users to locate archived information that may be of interest to them. In one embodiment, the system's discovery features may include a facility that permits users to browse and search for archived information, a facility that selects and presents archived data requests and results based on users' identified or observed characteristics or behavior, and/or a facility that selects and presents archived data requests and results based on characteristics identified by the system operator (such as "most recent," "most popular," and "highest rated").

The sense-on-demand data system may permit users to communicate with each other in a variety of ways. In one embodiment, users may submit comments and metadata relating to, or ratings of, other users, data responses, and other information available on the service. In another embodiment, users may engage in direct discussions with each other on a one-to-one or multiparty basis, which discussions may be conducted in text, audio, or visual form.

Economic Transactions

Transaction Information Architecture

The sense-on-demand data system may enable users to conduct economic transactions relating to the subject matter of data requests and data responses, by means of a transaction sub-system. Such transactions may include, for example, the purchasing of goods and services and the making of reservations.

The transaction sub-system may contain a transaction information archive, which stores and organizes information relating to transaction opportunities and, when queried, transmits relevant information to the transaction information server. Information stored in the transaction information archive may include, for example, descriptions of the items available for purchase or reservation, information about sellers and service providers, and proposed pricing, incentives, and other terms for transactions. In one embodiment, the transaction sub-system contains a user interface to the transaction information archive that allows potential sellers and service providers to add, delete, and modify information relating to goods and services available for purchase or reservation.

The transaction sub-system may contain a transaction information server, which receives transaction information relating to particular data requests and data responses from the transaction information archive, and makes such information available to requesting users. In one embodiment, the transaction information server creates a Web page or Web pages relating to each transaction opportunity and inserts links to those Web pages into relevant result sets.

The transaction sub-system may contain a transaction pipeline, which allows requesting users to consummate transactions relating to the subject matter of data requests and data responses. In one embodiment, the transaction pipeline solicits and receives information from the requesting user that is necessary or desirable to complete the transaction, solicits and receives necessary or desirable information from the party providing the goods or services for sale or reservation, calls to and receives information from databases (such as user account databases) that contain information that is necessary or desirable to complete the transaction, delivers information to the parties relating to the transaction, delivers information to other databases (such as user account databases) relating to the transaction, and communicates with payment processing mechanisms, such as online credit card processing mechanisms.

The transaction sub-system may contain a security and authentication component, which may prevent transactions by unauthorized users of authorized devices, or transactions by unauthorized devices that attempt to misrepresent themselves as authorized devices.

Transaction Flow

The transaction sub-system may be used to create and present calls to action regarding transaction opportunities to requesting users. In one embodiment, the response server transmits information relating to a data request and/or its associated result set to the transaction information archive. When the transaction information archive receives such information, it calls a response selection component that compares the request/response information with data regarding stored transaction opportunities. Using various matching algorithms and operational instructions, the selection component identifies those stored transaction opportunities that are relevant to the data request and/or its associated result set. The transaction information archive then transmits information relating to those transaction opportunities to the transaction information server.

In the ski resort example, the response server may submit information relating to the result set to the transaction information archive. Such information may include the query terms "conditions," "Crystal," "Mountain," and "Resort." The transaction information archive may identify a stored transaction opportunity for purchasing lift tickets at the resort at a $10 discount, and transmit information relating to the transaction opportunity to the transaction information server.

When the transaction information server receives information regarding a potential transaction from the transaction information archive, it transmits a graphic, textual, or audio transaction call to action to the response server, which is appended to the relevant result set. In one embodiment, the transaction information server creates a Web page (or Web pages) containing information relating to the transaction opportunity, and the call to action contains an embedded hyperlink to the transaction opportunity Web page. When the requesting user activates that hyperlink, his or her Web browser is redirected to the transaction opportunity Web page.

The call to action and/or the transaction opportunity Web page may have a link to the transaction pipeline. When the requesting user activates that link, the user is led through a series of functions, whereby he or she provides information necessary or desirable to complete the transaction, makes payment for the transaction, receives confirmation of payment, and receives information that allows him or her to claim the purchased or reserved goods or services.

In the ski resort example, the transaction information server may transmit a call to action to the response server consisting of the text "Get $10 off your Crystal lift ticket. Buy now!" and of a graphic of the Crystal Mountain Resort. The response server then would insert the call to action as an advertisement in the result set Web page. In addition, the transaction information server may create a Web page relating to the transaction opportunity. That Web page may contain additional information about the resort and the transaction opportunity and a link to the transaction pipeline. When the requesting user clicks on the result set Web page advertisement, his browser would be directed to the transaction opportunity Web page. When the user activates the link to the transaction pipeline, he would be able to purchase the lift ticket and receive instructions on how to print the lift ticket on his computer or how to claim the lift ticket at the resort.

Classified Advertising

Classified Advertising Architecture

The sense-on-demand data system may enable users to present and respond to classified advertisements, by means of a classified advertising sub-system. The classified advertising sub-system may contain an item information archive, which contains information regarding transaction opportunities and, when queried, transmits relevant information to the item information server. Such information may include, for example, descriptions of the items available for purchase, information about sellers and service providers, and proposed pricing, incentives, and other terms for transaction opportunities. In one embodiment, the classified advertising sub-system contains a user interface to the item information archive that allows potential sellers and service providers to add, delete, and modify information relating to those items.

The classified advertising sub-system may contain an item information server, which receives item information from the item information archive, creates an item result set, and distributes or makes accessible the item result set according to designated distribution rules. In one embodiment, the item information server distributes result sets to such destinations, and in such formats, as are specified by the relevant requesting users and/or the system operator. Such destinations may include, among other things, Web pages served by the system to requesting users, cellular telephones, and other portable communication devices operated by requesting users, and personal archives of requesting users that are stored on the system.

Transaction Flow

The sense-on-demand data system may be used to create classified advertisement item requests. In one embodiment, item requests may be generated by system users from mobile or fixed communication devices. Item requests may be similar in composition to data requests, except that they may contain a flag or other terms that differentiate them from other types of data requests. When an item request is submitted to the query interface, the request is transmitted to the query prefilter, where additional search criteria and metadata terms may be appended. The complete item request then may be transmitted to the query engine, which in turn transmits the item request to the item information archive.

For example, a person who would like to buy a used bicycle may visit the sense-on-demand data system's Web home page and enter an item request, such as "used bicycle on Capitol Hill for less than $200." In such instance, the requesting user may check a box or use some other method to indicate that he is submitting a classified advertisement item request. When the item request is received by the query prefilter, the prefilter may add user account information, such as the requesting user's home city, and then transmit the complete item request to the query engine for further processing.

When the item information archive receives an item request, it calls a response selection component that compares the item request with data regarding stored transaction opportunities. Using various matching algorithms and operational instructions, the selection component identifies those stored transaction opportunities that are relevant to the item request. The item information archive then transmits information relating to those transaction opportunities to the item information server.

The item information server creates item result sets from transaction opportunity information received from the item information archive. The item information server may have a distribution component that distributes result sets when they are created by the item information server. In one embodiment, the distribution component makes the response set available to the requesting user in one or more manners of presentation. In one embodiment, the distribution component determines the form and method of presentation based on the preferences of the requesting user and the means by which the requesting user intends to access the response set. In one embodiment, the distribution component may present the result set as a Web page, may cause the requesting user's Web browser to be redirected to that Web page, and may add links to the Web page to the requesting user's personal archive.

In the used bicycle example, the item information archive may select transaction opportunities that are relevant to the requesting user's item request (e.g., bicycles for sale for less than $200 that are located in Seattle's Capitol Hill neighborhood) and transmit information regarding those transaction opportunities to the item information server. Such information may include, for example, pictures of the bicycles available for sale, and information regarding the make, age, and condition of the bicycles available for sale. The item information server may then create an item result set comprised of the selected transaction opportunities, and may present the item result set to the requesting user in the form of a Web page that lists all the transaction opportunities together with individual, more-detailed Web pages for each transaction opportunity.

The item result set presentation may offer the requesting user the option of submitting a data request relating to any transaction opportunity contained in the result set. In such instance, any data request will be processed in a manner similar to other data requests, except that the query engine will transmit the data request directly to the remote unit (or related proxy server) that is associated with the transaction opportunity. In one embodiment, the response server transmits the result set to the item information server, and the result set is made available to the requesting user as part of an updated item result set presentation.

In the used bicycle example, the result set Web pages may allow the requesting user to make data requests regarding specific transaction opportunities, such as "Can I get a picture of the derailleur?" In such case, the query server would send the data request to the seller's remote unit, the seller would capture the requested information and return it to the system, and the resulting data response would appear in a refreshed version of the result set Web pages.

The item result set may have a link to the transaction pipeline. When the requesting user activates that link, he or she is led through a series of functions, whereby the user provides information necessary or desirable to complete the transaction, makes payment for the transaction, receives confirmation of payment and receives information that allows him or her to claim the purchased or reserved goods or services.

Collaboration

The sense-on-demand data system may be used to allow groups of users to work together, using multiple, coordinated data responses to create collaborative works or to achieve collective objectives, by means of a collaboration sub-system. In various embodiments, the collaboration sub-system may be used for the purposes of creating information archives and works of artistic or social expression, monitoring places, objects, and events from a distance, gathering news, responding to private and public emergencies, and playing games.

Project Initiation

The collaboration sub-system may have a project initiation component, which allows the originator of a collaborative project to define the project's purpose, scope, specifications, and operational rules. In one embodiment, projects may be originated by system users, by the system operator, or by third-party project sponsors. In one embodiment, the flexibility afforded the project originator with respect to the project's parameters will vary depending on the characteristics of the originator and the nature and context of the project.

Participant Management

The collaboration sub-system may have a participant management component, which allows the project originator to invite qualifying users to become project participants, allows users who choose to participate to register as project participants, and monitors various participant attributes and activities.

Query Interface Component and Query Engine Enhancements

The collaboration sub-system may have an enhanced query interface component, which allows the project originator, project participants, and/or authorized third parties to input one or more data requests relating to the project, and which adds search criteria or search terms to data requests based on the project's operational rules. The collaboration sub-system may have an enhanced query engine that releases data requests in accordance with the project's operating rules.

Presentation Generator

The collaboration sub-system may have a project presentation generator, which creates a presentation template for each project based on the project's specifications, and populates the templates with information relating to the project. Such information may include, for example, descriptive information relating to the project, participant contact lists, and result sets. In one embodiment, the presentation template consists of one or more project Web pages. In one embodiment, the project presentation generator includes additional functional components, including a participant communication component that allows project participants to communicate with each other regarding result sets and a participant workspace component that allows project participants to interact with information contained in project result sets. For example, the participant workspace component may allow project participants to modify project result sets by creating mock-ups or other derivative works and by displaying such derivative works within the project's presentation template.

Project Archives

The collaboration sub-system may have one or more project archives, which store all information relating to projects, project activities, and project participants. In one embodiment, the project archives are included in the system storage archive.

Collaboration Process

Project Origination

The collaboration sub-system may allow system users to originate collaborative projects by means of the project initiation component. The project initiation component may include an initiation pipeline. The project initiation pipeline may consist of several steps by which the project originator sets operational parameters for the project, which steps may be completed at one time or at various times during the life of the project. In one embodiment, the project originator may provide information regarding the project, such as a project title, project description, and project objective, may define general participation criteria, or identify specific users who will act as project participants or who will be invited to become project participants, may select the manner in which data requests may be submitted, may select the manner in which project result sets will be displayed, and may select the community, communication, and content interaction features that will be employed by the project. The project initiation component will collect the project information submitted or selected by the project originator and transmit it to the project archive. In one embodiment, the project initiation component will transmit relevant information to the presentation generator, and the presentation generator will create a project template.

For example, a hiking group in Seattle could create a collaborative project that provides real-time condition information for all hiking trails in western Washington. In such case, a representative of the organization would visit the sense-on-demand data system's Web site and proceed through the origination pipeline. The originator may be prompted to provide information regarding the project and to select various options for conducting the project and presenting project-related result sets. Among other things, the originator may indicate that results will be presented in a project Web page with certain selected content, functional features, and design elements, and the presentation generator will create a project template that conforms to the originator's selections.

Participants

The participant management component may allow project originators to identify and/or recruit users to participate in the project. Depending on the implementation and the project, participants may be designated by the originator, may be recruited for a specific project from a list of invitees provided by the originator, or may be recruited from system users who have indicated their willingness to participate in collaboration projects. In cases where the originator has identified specific users who will act as project participants, the participant management system will transmit specified information regarding the participants to the project archive. In cases where the originator submits a list of invitees, the participant management component will transmit invitee information to the project archive, distribute invitations to the invitees, receive acceptances and rejections from invitees, and transmit the identities of participants to the project archive. In cases where participants will be recruited from the general pool of system users, the participant management component will advertise the project's existence to users who may wish to participate. Such advertisement may consist of, among other things, listing the project in a catalog of projects seeking participants and sending invitation messages to potential participants. The participant management system will receive acceptances from users who elect to participate, approve those users who satisfy any requirements for participation, and send information regarding participants to the project archive.

In the hiking example, the originator may indicate that any group member may participate in the project, and may therefore submit an email address for each group member. The participant management component then may send email invitations to the invitees, which invitations may contain "response links" back to the participant management component. When an invitee clicks on a response link, his or her Web browser or email client may be redirected to the sense-on-demand data system Web site, where he or she may be prompted to register as a project participant and, if necessary, download remote unit software.

Request Generation

The collaboration sub-system's enhanced query interface component will permit various parties to submit data requests relating to the project, as specified by the project's operational parameters. In one embodiment, the query interface component may automatically generate data requests based on information obtained from third-party data sources (like newswire reports and police scanner data). In another embodiment, a project participant who wishes to provide a data response that does not relate to an existing data request may be permitted to submit a data request simultaneously with his or her data response. The enhanced query interface component will accept qualifying data requests, add search criteria or search terms based on the project's operational parameters, and send the complete data requests to the query engine.

In the hiking example, the originator may specify that he is the only party permitted to submit data requests. He then may submit a series of data requests for each hiking trail in western Washington, using a map-based graphical interface, each of which requests states "What is the current condition of ________ trail?" He may further indicate that the time-in-force for each data request will be five minutes.

Request Routing

The collaboration sub-system's enhanced query engine may contain a buffer component that stores project-related data requests until they are released, and a scheduling component that maintains scheduling information and rules for releasing project-related data requests. When a scheduled release time or designated release event occurs, the scheduling component releases the relevant data request, and the query engine calls a parsing component to identify request terms that are relevant to routing the request. The query engine then provides those request terms to a routing component that selects one or more participant remote units (or their associated proxy servers) to receive the data request. The query engine then calls a transmission component that sends relevant portions of the data request to the selected remote units (or their associated proxy servers) and to the project archives.

In the hiking example, the buffer component may store the project data requests, and the scheduling component, in accordance with the originator's instructions, may release a data request for each hiking trail every five minutes. When the query server receives a data request for a particular hiking trail, the query server may route the data request to remote units (or their associated proxy servers) that are located near the subject hiking trail.

Creation of Data Responses and Presentation Template

As specified above, remote units (and their associated proxy servers) create project-related data responses and transmit them to the response server, and the response server creates project-related result sets based on those data responses. The distribution component then sends the result sets to the project archive and to the presentation generator, and the presentation generator inserts each result set into the presentation template as it is received. In one embodiment, the project originator may be permitted to filter, edit, and copy result sets prior to their insertion into the presentation template and may be entitled to restrict participant and third-party access to result sets and the presentation template. To the extent permitted by the project's operational parameters, project participants and third parties may access a project's presentation template and make use of the presentation generator's additional functions, such as its communication and workspace components.

In the hiking example, project participants located near a subject hiking trail may receive data requests on their remote units requesting condition information relating to the trail. Participants then may take photographs or make videos of the trail, the trailhead or the trail's parking lot and/or may provide condition information in textual or other formats. The responding users' remote units may send the data responses to the response server, which then may create a result set (or revised result set) and transmit it to the project archive and the presentation generator. The presentation generator may insert the information into the project template, which may be presented in the form of a project Web site. The end result of these processes is that a group member or third party may visit the project Web site, select a hiking trail (by map, text search, or otherwise), and obtain real-time condition information regarding the trail. The project Web site may allow participants and other visitors to submit comments and other information regarding trails, which may be used to supplement data responses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing system for providing responses to requests of requesters, the responses being provided by responders, the requesters and responders being users of the computing system, the responders having devices, the method comprising:
   receiving a request for information from a requester, the request requesting information as to a condition associated with a location of interest;
   identifying devices of responders, the identified devices being in proximity of the location of interest and the responder capable of providing information as to the condition associated with the location of interest;
   sending the request to the identified devices, wherein after receiving the request, one or more responders enter via their device information as to the condition associated with the location of interest that is sent to the computing system as a response;
   receiving a response from one or more identified devices, the responses including information as to the condition associated with the location of interest; and
   sending a response to the requester, the response including information as to the condition associated with the location of interest derived from one or more of the received responses
   wherein each request is associated with a location of interest and each request is sent to devices in proximity of the location of interest so that a user of a device can respond with information as to the condition associated with that location of interest.

2. The method of claim 1 wherein a device of a responder is a mobile device of a user.

3. The method of claim 2 wherein the mobile device collects the requested information from the user of the mobile device.

4. The method of claim 3 including generating a rating of users indicating quality of the information collected from the users.

5. The method of claim 2 wherein the request relates to a geographic area from which the information is to be collected.

6. The method of claim 1 wherein one of the identified devices is a proxy server that collects from remote devices information as to the condition associated with the location of interest.

7. The method of claim 1 including archiving responses to requests and when a request is received, identifying archived responses to the request and sending an identified archived response to the requester.

8. The method of claim 7 wherein an archived response is sent to the requester before responses are received from the devices.

9. The method of claim 1 wherein a request has an associated time-in-force and wherein requests are sent to devices until the time-in-force has expired.

10. The method of claim 1 including identifying a device that is at a fixed location, sending the request to the identified device at the fixed location, and receiving a response from the identified device at the fixed location.

11. The method of claim 10 wherein the device at the fixed location automatically collects information using sensors connected to the device at the fixed location.

12. The method of claim 1 wherein the received request has an associated start time and the request is sent to the identified devices after the start time has passed.

13. The method of claim 1 wherein the requester indicates a price that the requester is willing to pay for the requested information and devices are identified based on price for which the device will provide the collected information.

14. The method of claim 1 including assigning a system-wide address to each device, the system-wide address of a device being mapped to a local address of the device.

15. The method of claim 1 wherein the identifying includes ranking the devices based on an attribute selected from the group consisting of location of the device, authorization of the device, third-party ranking of the device, sensing type of the device, and time since last request was sent to the device.

16. The method of claim 1 wherein a request for information is received in response to the requester selecting a link on a web page of a third party.

17. The method of claim 1 wherein the request for information is received from a mobile device.

18. The method of claim 1 wherein request for information is received from a communication device that is at a fixed location.

19. The method of claim 1 wherein the request for information is generated programmatically.

20. A computing system for providing responses to requests of requesters, the responses being provided by responders, the responders having devices that are mobile computing devices, comprising:
 a memory storing computer-executable instructions of:
  a component that receives a request for information from a requester, the request requesting information as to a condition associated with a location of interest;
  a component that identifies devices of persons that are currently in proximity of the location of interest such that the devices are capable of providing information as to the condition associated with the location of interest;
  a component that sends a request to the identified devices, the sent request being derived from the request received from the requester, wherein after receiving the sent request, one or more persons enter via their device information as to the condition associated with the location of interest that is sent to the computing system as a response;
  a component that receives a response from one or more identified devices, the responses including information as to the condition associated with the location of interest; and
  a component that sends a response to the requester, the response including information as to the condition associated with the location of interest, the information derived from one or more of the received responses; and
 a processor for executing the computer-executable instructions stored in the memory.

21. The computing system of claim 20 wherein a request for information is received in response to the requester selecting a link on a web page of a third party.

22. The computing system of claim 21 including a component that generates a rating of a person indicating quality of the information collected from that person.

23. The computing system of claim 20 wherein the request relates to a geographic area from which the information is to be collected.

24. The computing system of claim 20 including a component that identifies a device that is at a fixed location, sends the request to the identified device at the fixed location, and receives a response from the identified device at the fixed location.

25. The computing system of claim 20 including a component that responds to requests and when a request is received, identifying archived responses to the request and sending an identified archived response to the requester.

26. The computing system of claim 25 wherein an archived response is sent to the requester before responses are received from the devices.

27. The computing system of claim 20 wherein a request has an associated time-in-force and wherein requests are sent to devices until the time-in-force has expired.

28. The computing system of claim 20 wherein the received request has an associated start time and the request is sent to the identified devices after the start time has passed.

29. The computing system of claim 20 wherein the requester indicates a price that the requester is willing to pay for the requested information and devices are identified based on price for which the device will provide the collected information.

30. The computing system of claim 20 including assigning a system-wide address to each device, the system-wide address of a device being mapped to a local address of the device.

31. The computing system of claim 20 wherein the component that identifies ranks the devices based on an attribute selected from the group consisting of location of the device, authorization of the device, third-party ranking of the device, sensing type of the device, and time since last request was sent to the device.

32. The computing system of claim 20 wherein of the request for information is received from a mobile device.

33. The computing system of claim 20 wherein the request for information is received from a communication device that is at a fixed location.

34. The computing system of claim 20 wherein the request for information is generated programmatically.

35. A non-transitory computer-readable storage medium storing computer-executable instructions for controlling a computer to provide responses to requests of requesters, by a method comprising:
 receiving a request for information from a requester, the request requesting information associated with a location of interest;
 identifying devices of responders, the identified devices being mobile devices that are currently in proximity of the location of interest and capable of providing information associated with the location of interest;
 sending the request to the identified devices, the sent request being derived from the received request for information, wherein after receiving the sent request, one or more devices collect information associated the location of interest that is sent to the computing system as a response;
 receiving a response from one or more identified devices, the responses including information associated with the location of interest; and
 sending a response to the requester, the response including information associated with the location of interest derived from one or more of the received responses
 wherein each request is associated with a location of interest and each request is sent to devices in proximity of that location of interest so that the responder can respond with information associated with that location of interest.

36. The non-transitory computer-readable storage medium of claim 35 wherein a device is a mobile device of a user.

37. The non-transitory computer-readable storage medium of claim 36 wherein the mobile device collects the requested information from the user of the mobile device.

38. The non-transitory computer-readable storage medium of claim 37 including generating a rating of users indicating quality of the information collected from the users.

39. The non-transitory computer-readable storage medium of claim 35 wherein the information relates to a condition associated with the location of interest.

40. The non-transitory computer-readable storage medium of claim 35 wherein the request for information is received from a mobile device.

41. The non-transitory computer-readable storage medium of claim 35 wherein request for information is received from a communication device that is at a fixed location.

42. The non-transitory computer-readable storage medium of claim 35 wherein the request for information is generated programmatically.

* * * * *